(12) United States Patent
Lear, Jr. et al.

(10) Patent No.: US 7,472,550 B2
(45) Date of Patent: Jan. 6, 2009

(54) COMBINED COOLING AND POWER PLANT WITH WATER EXTRACTION

(75) Inventors: William E. Lear, Jr., Gainesville, FL (US); Sherif A. Sherif, Ocala, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 409 days.

(21) Appl. No.: 11/151,951

(22) Filed: Jun. 14, 2005

(65) Prior Publication Data

US 2006/0037337 A1 Feb. 23, 2006

Related U.S. Application Data

(60) Provisional application No. 60/579,205, filed on Jun. 14, 2004.

(51) Int. Cl.
*F02C 1/00* (2006.01)
*F02G 3/00* (2006.01)
(52) U.S. Cl. ............... 60/728; 60/39.52; 60/39.511
(58) Field of Classification Search ............ 60/39.52, 60/728, 39.511, 39.17; 417/243, 250
See application file for complete search history.

(56) References Cited

U.S. PATENT DOCUMENTS

| | | | | | |
|---|---|---|---|---|---|
| 2,482,791 | A | * | 9/1949 | Kreitner et al. | 60/39.183 |
| 2,646,663 | A | * | 7/1953 | Sedille | 60/39.17 |
| 2,651,174 | A | * | 9/1953 | Bolsezian | 60/39.183 |
| 4,049,299 | A | * | 9/1977 | Rigollot | 290/52 |
| 5,809,768 | A | * | 9/1998 | Uematsu et al. | 60/39.465 |
| 6,263,661 | B1 | * | 7/2001 | van der Burgt et al. | 60/39.17 |
| 6,269,624 | B1 | | 8/2001 | Frutschi et al. | |
| 6,282,883 | B1 | * | 9/2001 | Uematsu et al. | 60/39.182 |
| 6,513,318 | B1 | * | 2/2003 | Wright | 60/39.511 |
| 6,532,745 | B1 | * | 3/2003 | Neary | 60/784 |
| 6,637,183 | B2 | * | 10/2003 | Viteri et al. | 60/39.182 |

(Continued)

FOREIGN PATENT DOCUMENTS

GB 2351323 A 12/2000
JP 200452631 A 2/2004

OTHER PUBLICATIONS

Khan, J.R. et al. "Second Law Analysis of a Novel Combined Cooling and Power Cycle with Water Harvesting", Proceedings of GT2005, ASME Turbo Expo 2005; Jun. 6-9, 2005, pp. 1-10.

(Continued)

*Primary Examiner*—William H Rodríguez
(74) *Attorney, Agent, or Firm*—Ackerman Senterfitt; Gregory A. Nelson; Gregory M. Lefkowitz

(57) ABSTRACT

A turbine engine system and a method for using the turbine engine system that includes at least one low-pressure compressor, at least one high-pressure compressor, at least one low-pressure turbine, and at least one high-pressure turbine. In addition, the turbine engine system includes an absorption refrigeration system that is used to pre-cool an air-gas mixture before it enters the high-pressure compressor. As such, the pre-cooled mixture is easier to compress, thereby increasing the thermal efficiency of the turbine engine. Additionally, the exhaust heat from the air-gas mixture that is pre-cooled may be used to drive the absorption refrigeration system. Lastly, water, may be extracted from the evaporator of the absorption refrigeration cycle.

22 Claims, 4 Drawing Sheets

U.S. PATENT DOCUMENTS

| | | | |
|---|---|---|---|
| 6,651,421 | B2 | 11/2003 | Coleman et al. |
| 6,848,249 | B2 | 2/2005 | Coleman et al. |
| 6,957,539 | B2 * | 10/2005 | Lebas et al. ............. 60/772 |
| 2002/0152754 | A1 * | 10/2002 | MacKay ............. 60/772 |
| 2003/0000222 | A1 | 1/2003 | Tsuji |
| 2005/0028529 | A1 * | 2/2005 | Bartlett et al. ............. 60/772 |

OTHER PUBLICATIONS

Khan, J.R. et al. "Demonstration of a Novel Combined Cooling and Power Gas Turbine with Water Harvesting", Americna Institute of Aeronautics and Astronautics, pp. 1-14.

Khan, J.R. et al. "Water Extraction and Performance of a Novel Pressurized CHP System", Americna Institute of Aeronautics and Astronautics, pp. 1-10.

Khan, J.R. et al. "A Novel Combined Absorption Cooling and Gas Turbine Engine with Water Harvesting for Hot and Arid Climates", RETBE, 2004, pp. 1-14.

Malhotra, V. et al. "Life Cycle Cost Analysis of a Novel Cooling and Power Gas Turbine Engine", Proceedings of IMECE2005, Nov. 5-11, 2005, pp. 1-14.

Khan, J.R. et al. "Performance of a Novel Combined Cooling and Power Gas Turbine with Water Harvesting", Proceedings of 2004 ASME Turbo Expo, Jun. 14-17, 2004, pp. 1-13.

* cited by examiner

COMBINED COOLING AND POWER PLANT WITH WATER EXTRACTION

CROSS-REFERENCE TO RELATED APPLICATIONS

This application claims priority to U.S. Provisional Patent Application No. 60/579,205, which was filed Jun. 14, 2004.

STATEMENT REGARDING FEDERALLY SPONSORED RESEARCH OR DEVELOPMENT

The United States Government has rights in this invention pursuant to Grant No. 58-3148-3-069 between the United States Department of Agriculture and the University of Florida.

FIELD OF THE INVENTION

The invention relates to combined cycle engines. More specifically, the invention relates to a gas turbine regenerative engine.

BACKGROUND OF THE INVENTION

There are many variations on simple cycle gas turbines, which can provide features such as small size, light in weight, reliability, simplicity, or other attributes. Emphasis is often placed on performance and power density, and achieving these objectives through use of known technologies and design principles for compressors, turbines, combustors, heat exchangers, and technology from related conventional material sciences has been attempted.

Component research and development efforts over recent years have served well to define advanced levels of aerodynamic and thermodynamic component efficiency. By combining these advances with similar gains in material sciences and cooling technologies, capability now exists to design for high stage pressure ratios and high operating temperatures. Nevertheless, the prior art increases in component technology still leaves room for improving the utility of these engines, while also increasing the number of applications in which these systems may be used.

Numerous system modifications have been proposed previously for increasing the performance of gas turbine engines, such as reheat cycles, humid air cycles, inlet cooling, and inlet water fogging. Each of these approaches offers benefits, but at the expense of additional system complexity and cost. One especially relevant modification is the use of recuperation, with or without intercooling, particularly for small gas turbine engines. Recuperated microturbines have significantly higher efficiency than unrecuperated microturbines, but the cost, size, and weight of the system are increased substantially. A recuperated microturbine has also been integrated with a vapor absorption refrigeration system in order to maintain high efficiency, utilizing waste heat extracted from the turbine exhaust to drive the refrigeration system. The difficulties with the current state of the art are that the system cost, size, and weight are increased substantially, the emissions levels are not improved, and water is not inherently extracted from the exhaust.

SUMMARY OF THE INVENTION

The present invention provides a turbine engine system and a method for using the same. The turbine engine system includes at least one low-pressure compressor, at least one high-pressure compressor, a low-pressure turbine and a high-pressure turbine, although additional compressors and turbines may be used. In addition, the turbine engine system recirculates a portion of the gas from the high-pressure turbine to the inlet of the at least one high-pressure compressor, thereby creating a "semi-closed cycle" engine. The turbine engine system also includes an absorption refrigeration system that is used to pre-cool a gas mixture of the air exiting the low-pressure compressor and/or the recirculated gas before the mixture enters the high-pressure compressor. The pre-cooled mixture requires less work to compress, thereby increasing the thermal efficiency of the turbine engine. Additionally, the exhaust heat from the gas mixture that is pre-cooled may be used to drive the absorption refrigeration system. Lastly, water may be extracted from the pre-cooled mixture in the evaporator of the absorption refrigeration cycle. The turbine engine system may also use one or more heat exchangers throughout the system.

In particular, in one aspect, the present invention provides a turbine engine system including a low pressure compressor for receiving air and providing compressed air, the compressed air connected to a mixing point, the mixing point connected to an input of a high pressure compressor, an output of the high pressure compressor connected to an input of a combustor, the combustor providing a hot gas flow, the hot gas flow connected to an input of a high pressure turbine, the high pressure turbine providing a hot exhaust gas flow, a low pressure turbine for receiving at least a portion of the exhaust gas flow, and a recirculation means for recirculating at least another portion of the hot exhaust gas flow back to mix with the compressed air at the mixing point to form an air-gas mixture; and an absorption refrigeration system; wherein the absorption refrigeration system is constructed and arranged to cool the air-gas mixture between the at least one low-pressure compressor and the at least one high pressure compressor.

In another aspect, the present invention provides a method for increasing the efficiency of a turbine engine having the steps of pre-cooling an air-gas mixture formed by mixing air exiting at least one low-pressure compressor of the turbine engine and a recirculated portion of a hot exhaust gas flow from a high pressure turbine; and feeding the pre-cooled air from the absorption refrigeration system to at least one high-pressure compressor of the turbine engine; wherein the air-gas mixture is pre-cooled using an absorption refrigeration system.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

The present invention provides a gas turbine cycle system that offers increased efficiencies. In an alternative embodiment, the present invention provides a gas turbine cycle system that permits water to be extracted from the system. In still other alternative embodiments, the present invention pre-cools an air-gas mixture entering the high pressure compressor and uses this heat to drive an absorption refrigeration system.

The present invention permits the production of power, refrigeration, heat, and fresh water by a machine which consumes fossil fuel or any other hydrocarbon-based fuel source. While other technologies may exist that produce the same products, the method of this invention is unique and it provides several overall advantages. Unlike current commercial equipment, the present invention, in one embodiment utilizes a gas turbine that operates on a semi-closed cycle. Waste heat removal occurs at an intermediate point in the cycle, not at the exhaust, in a region with moderately high pressure, which decreases the size and cost of any heat exchangers that may be used. Furthermore, an absorption refrigeration cycle is coupled to the power cycle in both directions, i.e., heat removed from the power cycle drives the refrigeration cycle, and some of the cooling from the refrigeration cycle is used internally in the power cycle. This increases the efficiency and power density of the system, and may allow for water, which is generated during combustion as well as that inducted as vapor into an engine inlet, to be condensed and removed from the engine.

Figure 1:
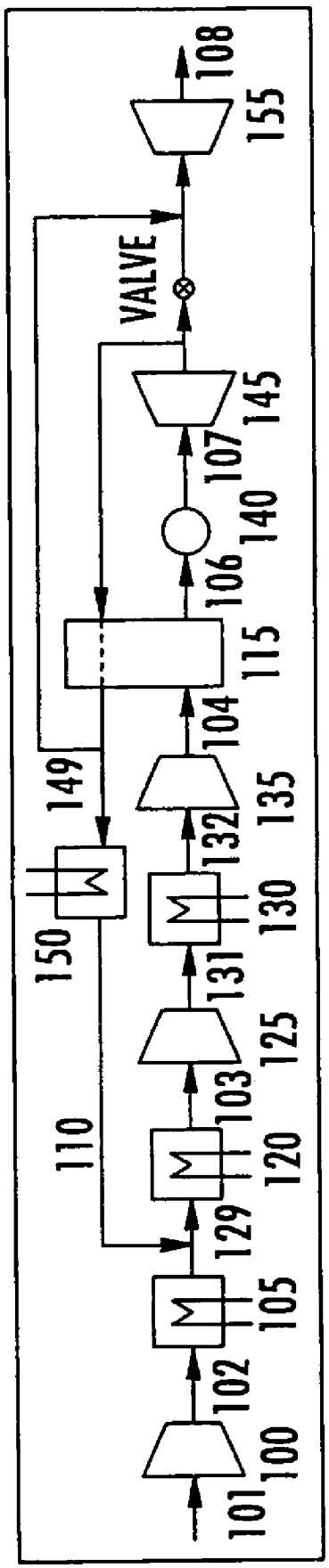
FIG. 1 is a schematic for a high-pressure regenerative turbine engine.

The present invention provides one or more beneficial characteristics and may be used in one or more applications. As shown in FIG. 1, the present invention improves upon a semi-closed gas turbine cycle, which is referred to herein as a High Pressure Regenerative Turbine Engine (HPRTE). It should be noted that the figure indicates all of the components modeled; a practical engine would include only a subset of the heat exchangers, and no valve. In this system, air enters the system at State 101 and is compressed by a low-pressure compressor 100. It may pass 102 through an optional heat exchanger 105. It is then adiabatically mixed with the recirculated combustion products 110 from a recuperator 115, which is a heat exchanger in which heat is recovered from the products of combustion. The combined air and exhaust products 129 may pass through a heat exchanger 120 and then enter 103 a high-pressure core where they are compressed in a high-pressure compressor 125. In alternative embodiments, the combined air and exhaust products 129 from the first high pressure compressor 125 may be passed to an intercooler 130 and then these products 132 may be passed to a second high-pressure compressor 135, although it is to be understood that in other embodiments, only one high pressure compressor is used. Next, the combined air and exhaust products 104 may be heated in the recuperator 115 and then passed 106 to a combustor 140, and then expanded 107 in a high-pressure turbine 145. After leaving the high-pressure turbine 145, all of the combustion gases enter the recuperator 115, where they transfer heat to the gases entering the combustor 140. At the exit of the recuperator, a portion of the gas 110 recirculates to the compressed air stream and may be passed through an optional heat exchanger 150. The remaining air 149 is passed through a low-pressure turbine 155 before exiting to the atmosphere 108. As discussed, FIG. 1 shows several optional heat exchangers in the system that may be installed based on the type of application.

The present invention improves upon existing HPRTE systems and provides a combined cycle configuration that is a power and refrigeration system in which waste heat is used to power an absorption refrigeration unit rather than a Rankine cycle. As such, the present invention permits pre-cooling of the compressed air and/or the potential for excess refrigeration production in select embodiments.

Figure 2:
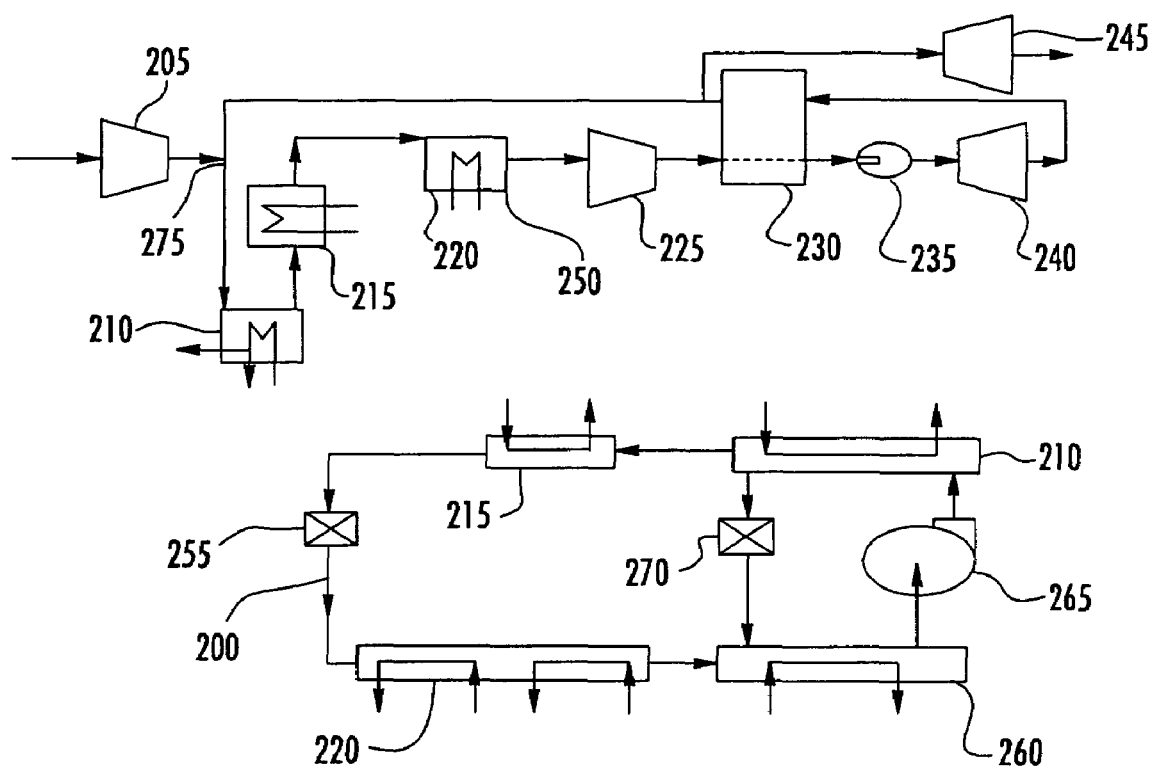
FIG. 2 is a schematic for a high-pressure regenerative turbine engine with absorption refrigeration combined cycle according to one embodiment of the present invention.

Accordingly, as shown in FIG. 2, the present invention provides, in one embodiment, a system that includes, as one part, an HPRTE. The absorption refrigeration portion may include a refrigerant that is, in this embodiment, a lithium bromide/water single-stage system. In this embodiment, the generator is placed after the mixing junction of the recirculated exhaust and the incoming air in the gas turbine cycle.

As shown in FIG. 2, the absorption refrigeration portion of the system includes a generator 210, which, in an absorption refrigeration system is the component that generates refrigerant using heat to drive off the refrigerant vapor from the absorbent. The generator receives a gas-air mixture that includes recirculated gas from the turbines and air that has been heated due to passing through the low-pressure compressor 205 and permits heat transfer to occur between this heated air-gas mixture and the refrigerant. In one embodiment, the refrigerant is part of a binary fluid system. One phase of the binary fluid is evaporated by the heat from the air-gas mixture while the other phase passes through a mixing cooler 215, which is a heat exchanger that cools the mixture, to the evaporator 220, where it is used to pre-cool the air stream that is then sent to the high-pressure compressor 225. Due to pre-cooling of the air-gas mixture, less work is needed to be applied to the pre-cooled mixture by the high-pressure compressor 225, thereby increasing the efficiency of the turbine engine. The exhaust heat supplied by the air-gas mixture in the generator 210 is used to drive the absorption refrigeration system 200. The evaporated phase of the binary fluid is mixed with the remaining phase from the evaporator 220 in an absorber 260, which is part of the vapor absorption system 200 that takes vapor and permits it to be cooled and absorbed by the absorbent, and this mixture is sent via pump 265 to the generator 210.

After passing through the high pressure compressor 225, the system operates as discussed prior wherein the mixture passes through recuperator 230, is then combusted in the combustor 235 and is then expanded in a high pressure turbine 240. A portion of the products from the high pressure turbine 240 are sent to the generator 210 after being mixed with the air from the low pressure compressor 205 at mixing point 275, while the remaining products are expanded in low-pressure turbine 245. However, as may be seen in FIG. 3, the mixing point 275 may be located after the evaporator 220 and prior to the high-pressure compressor 225.

The system 200 may also include expansion valve 255 and regulating valve 270 for expanding and/or regulating flow through the absorption system 200. Lastly, water 250 may be harvested from the evaporator 220.

Figure 3:
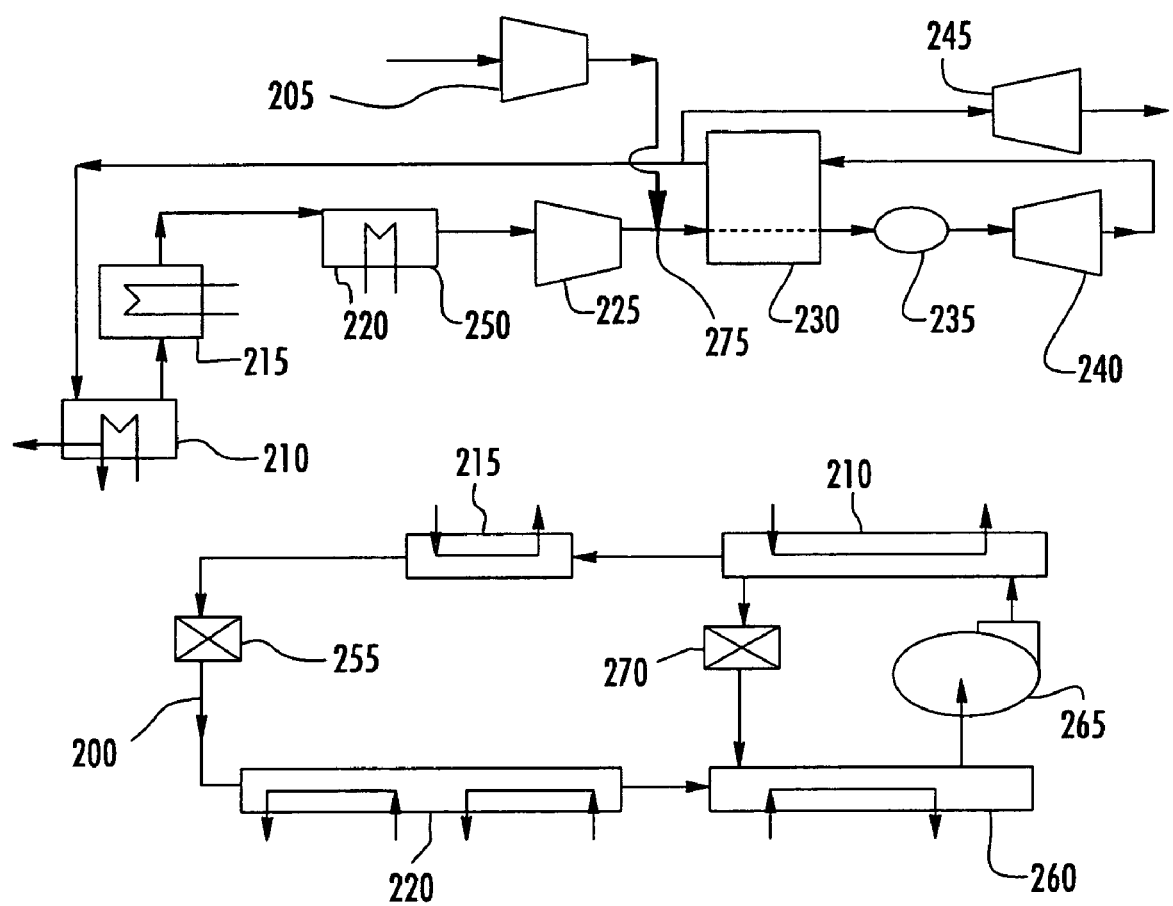
FIG. 3 is a schematic for a high-pressure regenerative turbine engine with absorption refrigeration combined cycle according to an alternative embodiment of the present invention.

In FIG. 3, the system described in FIG. 2 is provided, although the mixing point 275 is located after the vapor absorption system 200, not prior to the vapor absorption system 200. However, it is also to be understood that in alternative embodiments of the present invention, a vapor absorption system 200 may be located both before and after the mixing point 275, depending on the selected operating parameters of the system. In addition, it is to be understood that while two turbines are shown in the present invention, the concepts of the present invention may be utilized in those systems having a single turbine.

The present invention offers increased power generation efficiency as compared to standard HPRTE systems. A standard HPRTE system will generally have a thermal efficiency of from about 40 to about 45%. However, due to the fact that the air is pre-cooled, resulting in less work needed to compress the air, the HPRTE systems of the present invention are capable of thermal efficiencies that are several percentage points higher. In one embodiment, the HPRTE systems of the present invention are capable of thermal efficiencies that range from about 50 to about 60%. In another embodiment, the HPRTE systems of the present invention are capable of thermal efficiencies that range from about 55 to about 60%. In an additional embodiment, the HPRTE systems of the present invention are capable of providing cooling at a rate approaching the power rate of the engine (i.e. a 100 MW plant would also provide 30-100 MW of cooling, depending on the ambient temperature). The present invention may also have nearly constant efficiency and/or constant power, wherein excess refrigeration may be used, in part, to maintain the inlet at a constant temperature. Also, in other embodiments, the systems of the present invention produce water that may be used in other aspects, as opposed to conventional systems in which no water is produced.

In another embodiment, the present invention utilizes a two-stage generator rather than a one-stage generator. In this embodiment, heat is extracted first from the lower-quality incoming air and then the higher-quality recirculated exhaust. This embodiment provides a thermodynamic benefit and/or may provide for more refrigeration as the generator is the limit on the amount of refrigeration that may be produced.

In the single-stage system, the binary fluid may be lithium bromide/water. Lithium bromide/water systems are generally safe and do not require rectifying equipment as the lithium bromide does not evaporate. In alternative embodiments, other fluids may be used including, but not limited to, ammonia/water, and other refrigerant/absorbent binary mixtures commonly employed in absorption refrigeration systems. Alternatively, the gas turbine system described herein may use a refrigeration system having refrigeration derived from any refrigeration cycle other than vapor absorption, such as vapor compression or Peltier effect refrigeration.

The present invention may utilize standard components for the HPRTE. In one embodiment, the compressors and turbines used do not require substantial modification to existing compressors and turbines and operate under parameters within known operating parameters, although higher operating temperatures are generally beneficial. Stage loading is also well within current practice, and the system does not need to be operated at high temperature. Generally, though, state-of-the-art components are beneficial as they further increase the utility of the HPRTE system of the present invention.

For most hydrocarbon fuels, the products of complete combustion are carbon dioxide and water (in the form of water vapor). Depending on content, small amounts of sulphur dioxide may be produced, along with other gaseous products. However, the most significant products of combustion will be carbon dioxide and water. Accordingly, the present invention permits extensive amounts of water to be extracted from the evaporator. Depending on the types of fuel used, the present invention, in select embodiments, result in systems that, for every pound of fuel burned, in combination with the ambient air used to support combustion, the gases produced will contain as much as 2.25 pounds of water vapor and up to 2.75 pounds of carbon dioxide. The water, as well as any other selected combustion products, may be extracted from the evaporator and may be used as potable water with some treatment as there are no toxic substances in the water. Nevertheless, in alternative embodiments, additional treatment steps may be used to further purify the water that is extracted.

Other benefits of the present invention may be found in various embodiments of the present invention. The systems of the present invention offer extremely low emissions relative to other gas turbine engines including, but not limited to, decreases in $NO_x$, CO, and/or unburned hydrocarbons. In other embodiments, the systems of the present invention provide high efficiency at part power. The HPRTE efficiency remains high even at 15% power.

In other embodiments, the present invention is more compact than prior art systems. As such, the system imposes only a 30-40% size/weight penalty, rather than 200-500% penalty of conventional recuperated engines. A penalty in size or weight is any penalty associated with the fact that, as a system becomes heavier and/or bigger, the resulting systems cannot be used in as many places, become more expensive to build, and/or require additional components. Accordingly, if a system is smaller and/or lighter than conventional systems, there are fewer economic and/or operation penalties associated with use of that system. In the present invention, since the present invention is more compact than prior art systems, the systems of the present invention may be used in more places and require less materials, such that their size/weight penalties are reduced. For example, in certain embodiments, the systems have reduced air/exhaust flows approximately one-third that of conventional gas turbine engines, resulting in reduced filtration and exhaust handling costs.

The present invention may use exhaust heat from the turbines to power refrigeration with part of the cooling used to condense water from the combustion products, all while producing energy in an efficient manner. Accordingly, the present invention has utility in one or more applications. For example, in one embodiment, the present invention may be used for distributed power generation, especially in arid regions where the benefit of water extraction is especially beneficial. The present invention may also be used in large power plants. In one embodiment of the present invention, heat supplied to the generator may come from gas after the mixing point, which will maximize water production.

On a smaller scale, the present invention may be used to power vehicles, including heavy vehicles wherein power and cooling may be extremely beneficial, such as armed vehicles including, but not limited to, tanks, heavy trucks and armored vehicles, as well as naval vessels and advanced long-range and/or high-altitude aircraft.

The absorption refrigeration combined cycle may be used with all variants of HPRTE systems, including those that utilize wet compression and/or wet combustion, wherein water is injected into the compressor and/or combustor during operation during operation of the compressor and/or combustor to increase the capacity of the system.

Since the system can recover liquid water, several options are available for various applications. For example, in one alternative embodiment, the recovered water may be pumped to a higher pressure and injected into the gas path at the exit of the high pressure compressor [HPC] to increase efficiency of the system and power density, which is defined as the amount of power generated per unit volume of the system. Alternatively, the water may be used, directly or after conversion to steam using waste heat, to cool different parts of the system, such as high pressure turbine blades, thereby increasing efficiency and power. This latter approach would eliminate the need for using cooling air, thereby avoiding the significant efficiency and power penalty associated with air cooling.

Accordingly, the systems of the present invention provide one or more of the following benefits as compared to prior art systems that, while including an absorption refrigeration system, do not utilize the cooling from the absorption refrigeration system in the semi-closed turbine system and/or produce water. The systems of the present invention have several advantages over cooling, heating, and power plants constructed with existing commercial technology. The close coupling of these systems increases efficiency and specific power of the system. In addition, the efficiency of the system is not substantially affected by ambient temperature, since the high pressure compressor inlet temperature can be maintained at a lower temperature. Also, the size and cost of the systems are lower. As discussed, water is a natural product of the system, a portion of which may also be re-injected at the high pressure compressor discharge to increase efficiency and power density. Also, emissions of nitrous oxides, carbon monoxide, and unburned hydrocarbons are decreased. The combustor firing air contains large quantities of recirculated exhaust products, which lowers the flame temperature, a naturally-occurring beneficial effect similar to steam injection (a well-known technique for emissions improvement). Lastly, use of recirculation in the semi-closed cycle reduces the flows of air and exhaust, which decreases the size and cost of air filtration, air and exhaust ducting, exhaust cleanup, etc.

Reference will now be made to different embodiments and examples wherein the versatility of the present invention may be better understood. However, it is to be understood that these embodiments are for example purposes only and are not to be considered to be limiting in any manner of the overall scope of the present invention.

EXAMPLES

Example 1

Figure 4:
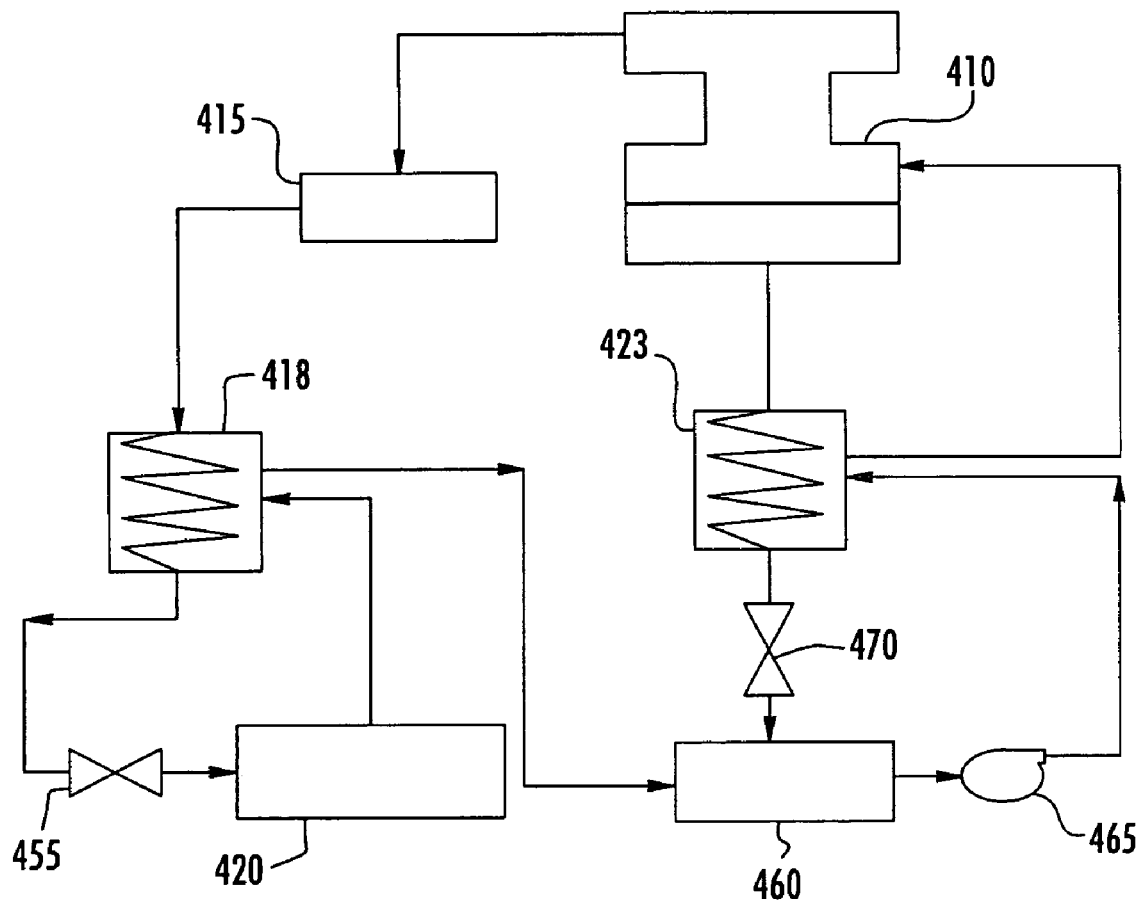
FIG. 4 is a schematic for a vapor absorption refrigeration system according to one embodiment of the present invention.

The cycle configuration for this example includes a combined gas-turbine absorption refrigeration cycle as shown in FIG. 4. The gas-turbine portion is the HPRTE that is shown in FIG. 1. The absorption refrigeration portion is an ammonia/water single-stage system. The generator 410 was placed after the mixing junction of the recirculated exhaust and the incoming air in the gas turbine cycle. The evaporator 420 of the system was placed after the condenser 415 and heat exchanger 418 and water was extracted in the evaporator 420. Also, evaporator temperatures were constrained to be above the freezing point of water due to the large amount of water vapor in the hot gas stream in contact with the evaporator 420. The system also included a second heat exchanger 423 and expanding 455 and regulating 470 valves.

The cycle code was written in FORTRAN to include all of the heat exchangers shown, but in the cases presented in this example 105, 130, and 150 were turned off. 105 and 150 were turned off to maximize the quality of the heat entering the generator 410. 130 was turned off because it was decided that for High Pressure Compressor 125 pressure ratios of 5 to 10, an inter-cooled HPC would not be sufficiently beneficial. Thus intercooling was accomplished solely by heat exchanger 418. Table 1 shows base case values for input parameters for the system. These are the values held constant during the parametric studies, except where explicitly stated.

TABLE 1

Base values for independent variables.

| Parameters | Values |
| --- | --- |
| Turbine Inlet Temperature ° C. | 1400 |
| Recuperator Inlet Temperature ° C. | 800 |
| Ambient Temperature ° C. | 26 |
| Evaporator Temperature ° C. | 10 |
| Low-Pressure Compressor Ratio, (PRC1) | 2 |
| Turbo-machinery polytropic efficiencies | 90% |
| Combustor Equivalence ratio, $\phi$ | 90% |
| Mass Flow Rate through HPRTE $m_1$, kg/sec | 0.5 |

The turbine and recuperator inlet temperatures were determined based on materials limits for the turbine blades and the recuperator walls. The ambient temperature was determined based on a hot day in which air conditioning would typically be used. The evaporator temperature was constrained by the freezing temperature of water. Thermodynamically it would have been possible and favorable to set the evaporator at a significantly lower temperature. However, coil frosting would have then become an issue because of the large amount of water in the exhaust stream in contact with the evaporator. The cycle parameter values given in Table 1 were used for studying the combined system.

The low-pressure compressor (PRC1) pressure ratio was based on prior studies. The turbo-machinery polytropic efficiencies, which are a measure of how close to ideal the compressor was, were based on state-of-the-art values. The equivalence ratio, which is the ratio of fuel/air divided by the stoichiometric fuel/air ratio, was set to 0.9 based on previous studies with the HPRTE. Those studies showed that performance improves as the equivalence ratio is raised. However, it was capped at 0.9 in a real system because it was hypothesized that at least 10% excess air was necessary to ensure complete combustion.

A one-dimensional steady-state model was used for performing the first law and the second law thermodynamic analyses of a High Pressure Regenerative Turbine Engine combined with a $NH_3$/Water vapor absorption refrigeration system. The model was used for studying the irreversibility contribution of the various components to the total irreversibility or the energy destruction of the system.

In this example, the first law efficiency ($\eta_I$) and the second law efficiency ($\eta_{II}$) are a strong function of the turbine inlet temperature (T6). The value of ($\eta_I$) increases from 52% to 55% as the value of T6 is increased from 1150° C. to 1450° C. for PRC1 equal to 2.0 Whereas the value of ($\eta_{II}$) increased from 48% to 51% for similar conditions. In addition, the water extraction capability of the system was expressed in terms of the parameter $R_F$ defined as the mass flow rate of water extracted to the mass flow rate of fuel consumed. It was observed that the turbine inlet temperature (T6) had an adverse effect on the values of $R_F$. Its value decreased with increasing values of T6, because of the decrease in the values of the recirculation ratios. Furthermore it was found that at a particular value of turbine inlet temperature there was a significant increase in the water extraction from the system when the value of PRC1 is increased from 1.0 to 2.0 and the increase is less significant when the values of PRC1 is increased beyond 2.0.

The effect of the low pressure compressor ratios PRC1, on the values of the first law efficiency ($\eta_I$) and the second law efficiency ($\eta_{II}$) was also investigated. It was found that the values of the two efficiencies increases as the value of PRC1 is increased from 1.0 to 2.0 and it reaches its maximum value and then decreases continuously as the value of PRC1 is further increased. The water extraction increases with the increase in the values of PRC1, however this increase is significant when the value of PRC1 is increased from 1.0 to 2.0 and the increase is less significant at higher pressure ratios.

The HPRTE system combined with the vapor absorption refrigeration system is shown to operate with high thermal efficiency (55%) high water extraction from the system in addition to providing cooling to a high external load. For the input values given in Table 1 except for T6=1150° C., it is found that the combined system produced approximately 1.57 kg of water per kg of fuel consumed. In addition it produced approximately 708 kW of extra power and 8 kW of external cooling load in the evaporator of the vapor absorption refrigeration system for $\dot{m}_1$=0.5 kg/sec, where $\dot{m}$=mass flow rate.

It is to be understood that while the invention has been described in conjunction with the specific embodiments thereof, that the foregoing description is intended to illustrate and not limit the scope of the invention. Other aspects, advantages and modifications within the scope of the invention will be apparent to those skilled in the art to which the invention pertains. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

We claim:

1. A turbine system comprising:
a turbine system including a first compressor for receiving air and providing compressed air,
the compressed air being fluidly connected to a mixing point,
the mixing point being fluidly connected to an input of a second compressor,
an output of the second compressor being fluidly connected to an input of a combustor, the combustor providing a hot gas flow,
the hot gas flow being fluidly connected to an input of a high pressure turbine, the high pressure turbine providing an exhaust gas flow,
a low pressure turbine being fluidly connected to the high pressure turbine for receiving at least a portion of the exhaust gas flow, and
a recirculation means for recirculating at least another portion of the exhaust gas flow back to mix with the compressed air at the mixing point to form an air-gas mixture; and
a refrigeration system disposed at least in part after the mixing point;
wherein the refrigeration system is constructed and arranged to cool the air-gas mixture between the first compressor and the second compressor, wherein the refrigeration system is constructed and arranged to use exhaust heat from (i) the first compressor, (ii) the recirculated portion of the hot exhaust gas flow, or (iii) both.

2. The system of claim 1, wherein the refrigeration system is an absorption refrigeration system and includes a fluidly connected absorbent/refrigerant-comprising loop including a serially connected condenser, expansion valve, evaporator, absorber, pump and at least one generator, wherein the generator is fluidly connected to the evaporator and is disposed between the mixing point and the high pressure compressor.

3. The system of claim 2, wherein the absorbent/refrigerant is a binary fluid selected from lithium-bromide/water and ammonia/water.

4. The system of claim 2, wherein the evaporator includes a mechanism for extracting water.

5. The system of claim 4, wherein said mechanism for extracting water is fluidly connected to turbine blades of said high pressure turbine.

6. The system of claim 1, wherein the second compressor is a high-pressure compressor and the system includes at least two high-pressure compressors in series and having an intercooler located between the at least two high-pressure compressors.

7. The system of claim 1, further comprising a generator, an intercooler, and an evaporator, wherein the mixing point is fluidly connected to the generator, the generator is fluidly connected to the intercooler, the intercooler is fluidly connected to the evaporator, and the evaporator is fluidly connected to the second compressor.

8. The system of claim 1, further comprising a generator, an intercooler, and an evaporator, wherein the generator is fluidly connected to the intercooler, the intercooler is fluidly connected to the evaporator, the evaporator is fluidly connected to the mixing point, and the mixing point is fluidly connected to the second compressor.

9. The system of claim 1, wherein the first compressor is a low-pressure compressor and the second compressor is a high-pressure compressor.

10. The system of claim 1, further comprising a recuperator arranged such that said exhaust gas flow from said high pressure turbine heats said air-gas mixture prior to said air-gas mixture entering said combustor.

11. The system of claim 1, further comprising a recuperator having a first flow path fluidly connected to an output of said second compressor and an input of said combustor and a second flow path fluidly connected to an output of said high pressure turbine and an input of said mixing point.

12. A method for increasing the thermal efficiency of a turbine engine comprising the steps of:
using a refrigeration system to pre-cool an air-gas mixture formed by mixing air exiting a first compressor of the turbine engine and a recirculated portion of a hot exhaust gas flow from a high-pressure turbine; and
feeding the pre-cooled air-gas mixture from the refrigeration system to a second compressor of the turbine engine, wherein the air-gas mixture includes exhaust heat and the exhaust heat is used to drive the refrigeration system.

13. The method of claim 12, wherein the thermal efficiency of the turbine engine is increased to from about 50 to about 60%.

14. The method of claim 12, wherein the refrigeration system is an absorption refrigeration system and includes a fluidly connected absorbent/refrigerant-comprising loop including a serially connected condenser, expansion valve, evaporator, absorber, pump and at least one generator, wherein the generator is connected to the evaporator and is disposed between the mixing point and the high pressure compressor.

15. The method of claim 14, wherein the absorbent/refrigerant is a binary fluid selected from lithium-bromide/water or ammonia/water.

16. The method of claim 14, further comprising the step of extracting water from the evaporator.

17. The method of claim 16, further comprising the step of injecting the extracted water into the gas beyond an exit of the second compressor.

18. The method of claim 16, further comprising: using water extracted from said evaporator to cool blades of said high-pressure turbine.

19. The method of claim 12, wherein the feeding step comprises pre-cooling the air-gas mixture entering the second compressor below an ambient temperature.

20. The method of claim 12, further comprising using a recuperator to recuperate thermal energy from said exhaust gas flow to heat the pre-colled air-gas mixture from said second compressor, wherein said pre-cooled air-gas mixture passes through said recuperator before being fed to said combustor.

21. A turbine system comprising:
a turbine system including a first compressor for receiving air and providing compressed air,
the compressed air being fluidly connected to a mixing point,
the mixing point being fluidly connected to an input of a second compressor,
an output of the second compressor being fluidly connected to an input of a combustor, the combustor providing a hot gas flow,
the hot gas flow being fluidly connected to an input of a high pressure turbine, the high pressure turbine providing an exhaust gas flow,
a low pressure turbine being fluidly connected to the high pressure turbine for receiving at least a portion of the exhaust gas flow, and
a recirculation means for recirculating at least another portion of the exhaust gas flow back to mix with the compressed air at the mixing point to form an air-gas mixture; and
a refrigeration system disposed at least in part after the mixing point;
wherein the refrigeration system is constructed and arranged to cool the air-gas mixture between the first compressor and the second compressor, wherein the refrigeration system is an absorption refrigeration system and includes a fluidly connected absorbent/refrigerant-comprising loop.

22. The system of claim 21, further comprising a recuperator arranged such that said exhaust gas flow from said high pressure turbine heats said air-gas mixture prior to said air-gas mixture entering said combustor.

\* \* \* \* \*